US012620767B1

(12) United States Patent
McCahon et al.

(10) Patent No.: US 12,620,767 B1
(45) Date of Patent: May 5, 2026

(54) DEFENSIVE LASER AMPLIFICATION SYSTEM

(71) Applicant: APPLIED ENERGETICS, INC.,
Tucson, AZ (US)

(72) Inventors: Stephen William McCahon, Tucson,
AZ (US); Alan Kost, Tucson, AZ (US);
Gregory J. Quarles, Tucson, AZ (US)

(73) Assignee: Applied Energetics, Inc., Tucson, AZ
(US)

( * ) Notice: Subject to any disclaimer, the term of this
patent is extended or adjusted under 35
U.S.C. 154(b) by 944 days.

(21) Appl. No.: 17/817,726

(22) Filed: Aug. 5, 2022

Related U.S. Application Data

(60) Provisional application No. 63/260,028, filed on Aug.
6, 2021.

(51) Int. Cl.
| | |
|---|---|
| *H01S 3/10* | (2006.01) |
| *H01S 3/067* | (2006.01) |
| *H01S 3/08* | (2023.01) |
| *H01S 3/108* | (2006.01) |
| *H01S 3/1106* | (2023.01) |
| *H01S 3/23* | (2006.01) |

(52) U.S. Cl.
CPC ...... *H01S 3/10015* (2013.01); *H01S 3/06741*
(2013.01); *H01S 3/08059* (2013.01); *H01S*
*3/108* (2013.01); *H01S 3/1106* (2013.01);
*H01S 3/2308* (2013.01)

(58) Field of Classification Search
None
See application file for complete search history.

(56) References Cited

U.S. PATENT DOCUMENTS

| | | | | |
|---|---|---|---|---|
| 6,785,032 B1 * | 8/2004 | Le Mere | .............. | G01J 1/0418 |
| | | | | 359/227 |
| 7,193,771 B1 * | 3/2007 | Smith | .................... | H01S 3/042 |
| | | | | 372/66 |
| 8,994,819 B2 * | 3/2015 | Bennett | .................. | G01S 17/42 |
| | | | | 348/143 |
| 2009/0097512 A1 * | 4/2009 | Clowes | ................ | H01S 3/0085 |
| | | | | 372/21 |

* cited by examiner

*Primary Examiner* — Eric L Bolda
(74) *Attorney, Agent, or Firm* — Martensen IP; Michael
C. Martensen

(57) ABSTRACT

A counter high-energy laser system directs high-intensity
laser radiation back to a threat laser in the form of an
ultra-short optical pulse (USP). The retro-directed USP
induces permanent internal optical damage in the threat
laser, thus disabling the threat by exploiting the very high
optical gain at the source of an incoming laser thereby
causing an injected pulse to grow exponentially in energy
and peak power within the threat laser optical train until it
reaches a damaging threshold. The existing optical energy
from the threat laser system and stored in the laser beam
from threat system is exploited thereby enabling the size,
weight, and power of the counter laser system to be signifi-
cantly reduced. The wavelength of the counter pulse is
automatically matched to the threat.

25 Claims, 5 Drawing Sheets

DEFENSIVE LASER AMPLIFICATION SYSTEM

RELATED APPLICATION

The present application relates to and claims the benefit of priority to U.S. Provisional Patent Application No. 63/260, 028 filed 6 Aug. 2021 which is hereby incorporated by reference in its entirety for all purposes as if fully set forth herein.

BACKGROUND OF THE INVENTION

Field of the Invention

Embodiments of the present invention relate, in general, to ultra-short pulse laser energy and more particularly to an automated high energy laser countermeasure using an ultra-short pulse laser.

Relevant Background

A LASER, or Light Amplification by Stimulated Emission of Radiation, is a high-power light harnessed to create a narrow directional beam. At its most basic levels a laser includes a gain medium in an optical cavity. The cavity is defined, in most instances, by a pair of mirrors at either end that reflect light within the cavity. An energy source or pumping energy in the form of photon or electrical energy completes the basic component list.

The gain medium is a set of atoms, molecules, or ions in gaseous, solid, or liquid state that acts to amplify the light. A state in which the number of atoms in the upper energy level is greater than the atoms in the lower energy, or inversion, must exist to form a stimulated emission.

An optical pumping light is often used to create the necessary inversion for a laser. A gain medium absorbs the light from a source promoting a portion of the atom population from their ground state to a higher energy state. A material continuously exposed to a pumping light forms a continuous wave while a pulsed wave is formed using flashes.

One known class of amplifying pumps are known as regenerative amplifiers. In such an amplifier light passes multiple times through a single gain medium, or plural gain media, to efficiently extract a gain. In a regenerative amplifier, an optical path is defined in which an input pulse or signal makes several passes before being directed out as an amplified signal. Laser pulses with ultrashort pulse durations in the picosecond or femtosecond ranges can be created using this technique. Multiple passes through the gain medium, such as a solid-state medium, are achieved by placing the gain medium in an optical cavity or resonator, together with an optical switch that may be formed by an electro-optic modulator.

Laser light can also be amplified by Raman amplification. Raman amplification is the absorption of photons from a pumped signal to a seed signal that are then immediately re-emitted as lower-frequency laser-light photons ("Stokes" photons) by a process called stimulated Raman scattering. The difference between the two photon energies, the pump signal, and the seed signal, is fixed and corresponds to a vibrational frequency of the gain medium.

Typically, a population inversion is first created forming a laser emission, or the pumped laser signal. The emission is thereafter amplified via a Raman amplifier. In the current state of the art the Raman amplifier is outside of the optical cavity and not all the energy of the pumped laser signal is transferred to the seed signal. While the seed signal is amplified a degree of inefficiency exists, leaving a residual pumped laser signal. That is, there remains energy in the pumped laser signal that is unused and normally discarded.

Continuous Wave (CW) High Energy Laser Systems (HELS) are being developed and deployed by numerous countries. Such systems direct CW high energy lasers to sensitive optics, sensors, and the like to disrupt or destroy the device. CW HELS are a direct threat to satellites and their payloads including sensitive Electro-Optics (EO), Radio Frequency (RF) sensors, and physical structures. Current defense systems to a high energy laser system are either non-effective or nonexistent A CW laser refers to the fact that the light output intensity (energy) is constant over time and characterized by the amount of power it generates in Watts (W). An example of a CW laser is the laser pointer which emits a continuous beam of low power visible light. However, CW lasers in the range of 10 kW to >100 KW pose a serious threat. To appreciate the scope of the threat, recall the amount of energy in Joules (J) over time is expressed as Watts (W), where 1 W=1 J/s. As an example, consider a laser being used to heat water. A calorie is defined as the energy (J) to raise the temperature of 1 gram of water 1° C., or 4.2 J. To boil a cup of water from room temperature (30° C.) to boiling (100° C.), this would require 66,250 J of energy (4.2 J/g×225 g/cup). To do this with a CW laser in 5 minutes, requires a 220 W laser. Consider the effect of a laser having 100,000 watts.

What is needed is an on-board system with the autonomous capability to permanently damage or destroy or interdict a CW HELS threat, thereby providing self-protection. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A method and associated system for mitigating a laser threat whereby the light from the threat itself is used to automatically generate and power a high-peak-power return signal that is returned to the source threat where it is amplified to levels that disable the threat is hereafter describe by way of example.

An automated laser threat countermeasure system, according to one embodiment of the present invention, captures an incoming continuous wave laser threat and using characteristics of the income threat, creates an amplified ultra-short wavelength pulse at or near the same wavelength as the threat. As the ultra-short wavelength pulse emulates the continuous wave laser threat, the pulse is accepted into the amplification cavity of the threat. As the pulse is amplified within the threat it soon reaches a power level causing catastrophic damage to the threat system.

In one version of the present invention collection optics are configured to receive a continuous wave laser threat from a threat source. A threat conditioning module, coupled to the collection optics, filters the continuous wave laser threat to isolate a portion of the continuous wave laser threat for later use. That portion of the continuous wave laser threat is introduced to a laser pump cavity.

A master oscillator produces an ultra-short and ultra-broadband (supercontinuum) optical pulse that is injected into the energy transfer module. Within the energy transfer module, the threat laser amplifies a portion of the supercontinuum pulse that is a subset of the very broad collection of optical wavelength components in the supercontinuum pulse. The center of the spectrum of the amplified portion of the supercontinuum is located one Stokes shift from the wavelength of the laser threat, regardless of the wavelength of the incoming threat. Thus, the selection of the wavelength of the return pulse can be carried out automatically and without knowledge of the wavelength of the threat light. The width of the spectrum of the amplified portion of the supercontinuum is determined by the convolution of the spectrum for the laser threat and the Raman gain spectrum. The final result of the transfer energy to the ultra-short seed pulse is the production of an intense optical pulse with very high peak power at a wavelength that has a prescribed separation from the wavelength of the threat.

Lastly, transmission optics coupled to the Raman amplifier transmit the amplified ultra-broadband, supercontinuum pulse linked to the continuous wave laser threat to the source of the threat.

Other features of the present invention include that the laser cavity can be an amplifying fiber including a solid-core optical fiber. The amplifying fiber can also be photonic crystal fiber.

The master oscillator presented above is, in one embodiment, a mode-locked laser. The ultra-short pulse from the laser is spectrally broadened by a combination of nonlinear optical effects. Another aspect of the invention is that the Raman amplifier combines the portion of the continuous wave laser with the ultra-broadband, supercontinuum pulse. The result is that the amplified portion of the ultra-broadband, supercontinuum pulse is tied/linked to a wavelength of the continuous wave laser threat.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings.

Figure 1:
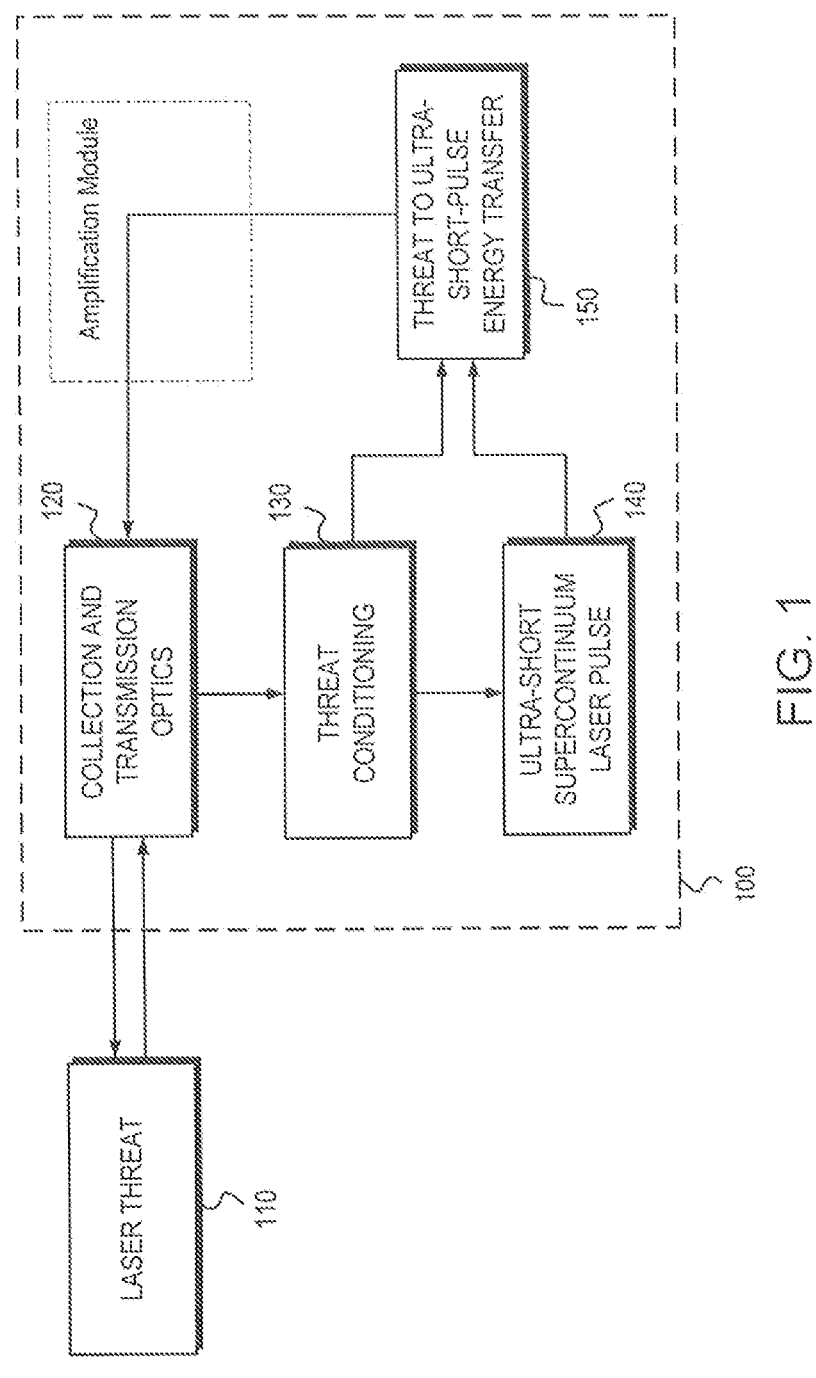
FIG. 1 provides a high-level block diagram of the counter high energy laser system according to one embodiment of the present invention.

The Figures depict embodiments of the present invention for purposes of illustration only. Like numbers refer to like elements throughout. In the figures, the sizes of certain lines, layers, components, elements, or features may be exaggerated for clarity. One skilled in the art will readily recognize from the following discussion that alternative embodiments of the structures and methods illustrated herein may be employed without departing from the principles of the invention described herein.

DESCRIPTION OF THE INVENTION

The present invention provides a counter high-energy laser system that directs very high-intensity laser radiation back to the threat laser in the form of an Ultra-Short optical Pulse (USP). The retroreflected USP of the present invention induces permanent internal optical damage in the threat laser, thus disabling the threat. The present invention exploits the very high optical gain in the source of an incoming laser that thereby causes an injected pulse to grow exponentially in energy and peak power until they reach a damaging threshold within the threat laser optical train. The present invention exploits the existing optical energy within the threat laser system and stored within the beam produced by the threat system thereby enabling the size, weight, and power of the counter laser system to be significantly reduced. For example, every millisecond a 10 kW to 100 kW CW threat laser transmits, 10 to 100 Joules can be used to create counter threat pulses of with peak powers several orders of magnitude higher than the incoming CW powers.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present), and B is false (or not present), A is false (or not present), and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with, or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under", or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Included in the description are flowcharts depicting examples of the methodology which may be used counter a CW high-energy laser system. In the following description, it will be understood that one or more blocks of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instruction.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

It will also be understood by those familiar with the art, that the invention may be embodied in other specific forms without departing from the spirit or essential characteristics thereof. Likewise, the naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

FIG. 1 provides a high-level block diagram of a counter high energy laser system 100 according to one embodiment of the present invention The present invention is characterized by a number of principles including: 1) the response of the present invention is immediate and flexible to counter a threat that can appear at any time with an exact wavelength that is unknown before the attack, 2) the response is able to overcome built in protection systems within the threat such as optical isolators and filters, 3) the response system is designed to minimize Size, Weight, Power and Cost (SWaP-C) and act without operator intervention, and 4) the processes and systems of the present invention are extendable over a broad range of wavelengths, including the Near-, Mid-, and Long-Wave IR.

As shown in FIG. 1, light from a laser threat 110 reaches an object such as a satellite where it strikes collection optics 120. The collected threat light is directed to a conditioning (filtering) subsystem 130 where it is prepared for use as an optical pump and as a reference source for a return USP. An ultra-short (time) and ultra-broadband (spectrum) laser USP seed 140 is produced from the threat laser optical signal forming a return pulse. A portion of the return pulse is amplified by energy transfer 150 from the amplified threat light. As the return USP is derived from the threat optical radiation the proper wavelength is always generated. The amplified counter threat return pulse is transferred to transmission optics 120, where it is collimated and directed towards the source of the threat.

Figure 2:
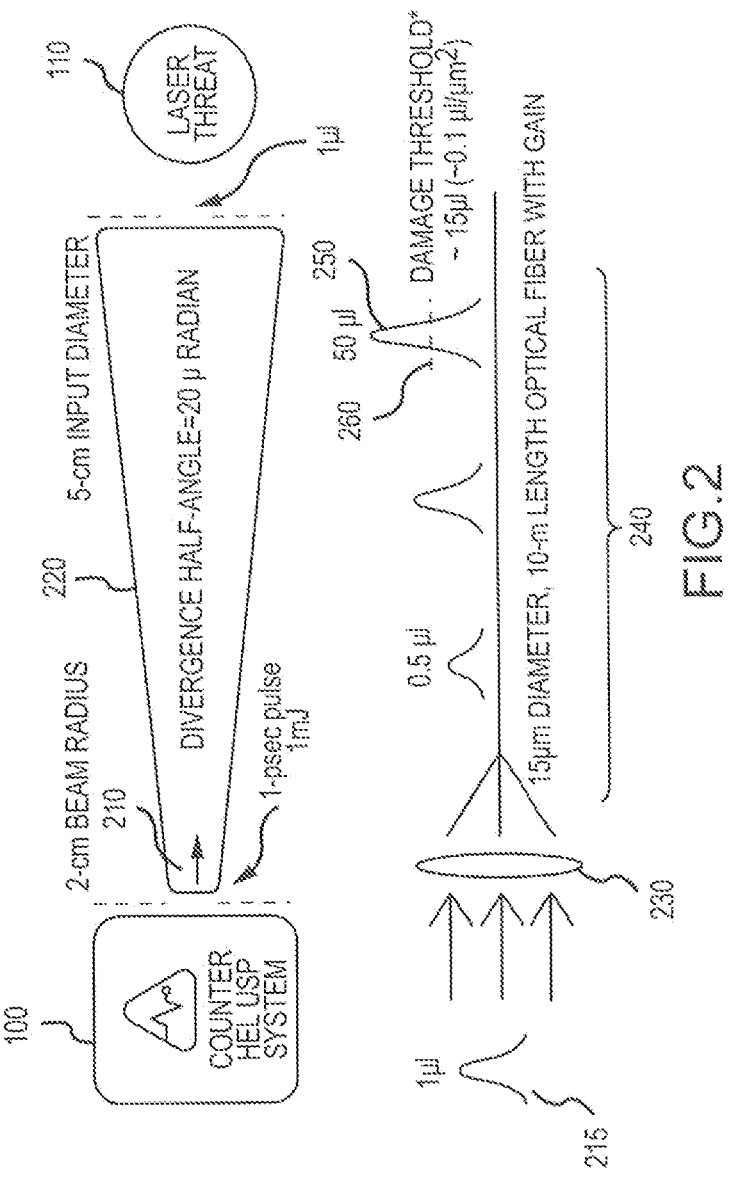
FIG. 2 illustrates the counter-threat return pulse of the present invention, within a train of pulses, inducing optical damage of the threat laser system defeating the threat.

FIG. 2 provides a graphical depiction how the counter-threat return pulse of the present invention, within a train of pulses, induces optical damage of the threat laser system defeating threat. The counter high-energy laser system 100 shown in upper left corner of FIG. 2, mounted onto a satellite in this depiction, is illuminated by the laser threat 110 shown on the upper right of FIG. 2. In response, the counter laser system returns a properly formatted ultra-short-pulse laser beam 210 to the threat laser 110. Propagation losses and beam divergence 220 spread the pulse over the threat's transmission optics 230. A portion of the counter-threat pulse 215 enters the threat laser by way of the threat's transmission optics 230 and is transferred to the amplifying medium 240 within the threat laser 110. The counter-threat pulse 215 is amplified by both gain due to the stimulated Raman effect as well as gain from amplification components of the threat laser as it propagates backwards through the threat. FIG. 2 shows a fiber laser threat to better illustrate the fundamental concepts of the present invention. The amplified and ultra-short counter-threat pulse produced by the present invention has very high optical intensity, which damages the amplifying medium of the threat laser and permanently disables it.

The values presented in FIG. 2 are illustrative of system performance. For the purposes of example, assume a threat 110 to be a high-power, continuous wave fiber laser with a near-IR wavelength. A counter-threat pulse 210 produced by the present invention 100, shown in the upper left corner of FIG. 2, with a temporal width of one picosecond, energy of one millijoule, and $1^{St}$ Stokes shifted wavelength is directed towards the threat 110. The far-field divergence 220 half-angle is assumed to be 20 micro-radian—the value for a moderately aberrated beam ($M^2$ value of 1.4). In this example, shown in the lower portion of FIG. 2, the energy of the counter-threat pulse 215 is attenuated by 3 dB upon passing between outward-facing optics 230 and the amplifying medium in the threat. As a result, a 0.5 microjoule pulse enters the amplification medium. The amplifying medium 240 is taken to be an optical fiber with a core diameter of 15 micron with an optical power of 1 KW at the output face. A propagation distance of 10 meters within the fiber for the counter threat pulse corresponds to an optical gain (due to Raman amplification alone) of 20 dB and a resulting pulse energy of 50 microjoule 250. The value of the counter threat pulse is three times higher than the expected optical damage threshold 260 of 15 microjoule (estimated of a measured value of 0.1 microjoule per square micron) thereby eliminating the threat The present invention has significant advantages over other approaches to mitigating threats to satellite components. For example, optical sensors and cameras could be protected by shutters or by windows that darken in response to a threat. However, these passive approaches do not eliminate a threat, which can continue to disrupt satellite operation indefinitely. Furthermore, shutters and most darkening mechanisms cannot respond rapidly enough to protect against an ultrafast counter-pulse. Fixed wavelength CW or long pulse lasers can disable threats by producing very high power or very high energy beams to damage to the threat's transmission optics. This latter active approach would require a large laser that would consume a large amount of supplemental power and be too massive to be carried as a payload.

The active counter-threat system of the present invention permanently disables threats. As compared with a counter laser that creates continuous wave or long-pulse (nanosecond to millisecond) light, the use of ultra-short optical pulses reduces the pulse energy required to damage a threat, thereby reducing the required size, weight, power, and cost.

As compared to a counter laser with a fixed wavelength, the new concept employs a wavelength that adjusts with the wavelength of the threat. This enables the counter threat system to protect against a variety of threat lasers with a broad range of optical wavelengths.

Assume for example, the collection optics of the present invention receives a CW threat laser of 1030-nm. With attention to FIG. 3, the incoming CW laser beam 310 is received at a fiber sub-assembly 320 forming a resonating cavity residing between two Bragg Gratings 330, in one embodiment, and resonates with the optical pump to increase size of the optical power circulating in the cavity. In one embodiment of the present invention a mode-locked master oscillator 340 with a center wavelength of 1030-nm (based on the received threat) creates and injects an ultra-short (sub-picosecond) supercontinuum pulse 350 into the resonance cavity. Specifically, the output of the master oscillator comprises a mode-locked laser coupled into solid-core optical fiber, or a photonic crystal fiber, configured to have a large optical nonlinearity to produce an ultra-broadband, supercontinuum pulse 350. The bandwidth of the optical pulse from the mode-locked laser is expanded by a combination of nonlinear optical effects. The bandwidth of the supercontinuum source extends to 1100-nm to ensure that portions of the spectrum coincide with the range of Raman gain for, in this example, the 1030-nm threat laser. The spectral bandwidth of the supercontinuum pulse, temporal pulse width, and chirp parameters are measured as part of this task. It should be noted that the super continuum pulse can be continuously generated and does not require information from the threat laser. In the case of a pulsed laser threat, information from the threat "pulse" can be used as a trigger for control.

The output 360 of the energy transfer sub-system is thereafter directed to back to the threat laser source. As the pulse wavelength aligns with the original threat CW signal, the optics of the threat laser will receive the incoming pulse, resulting in a cascading failure of the internal optical systems.

Figure 3:
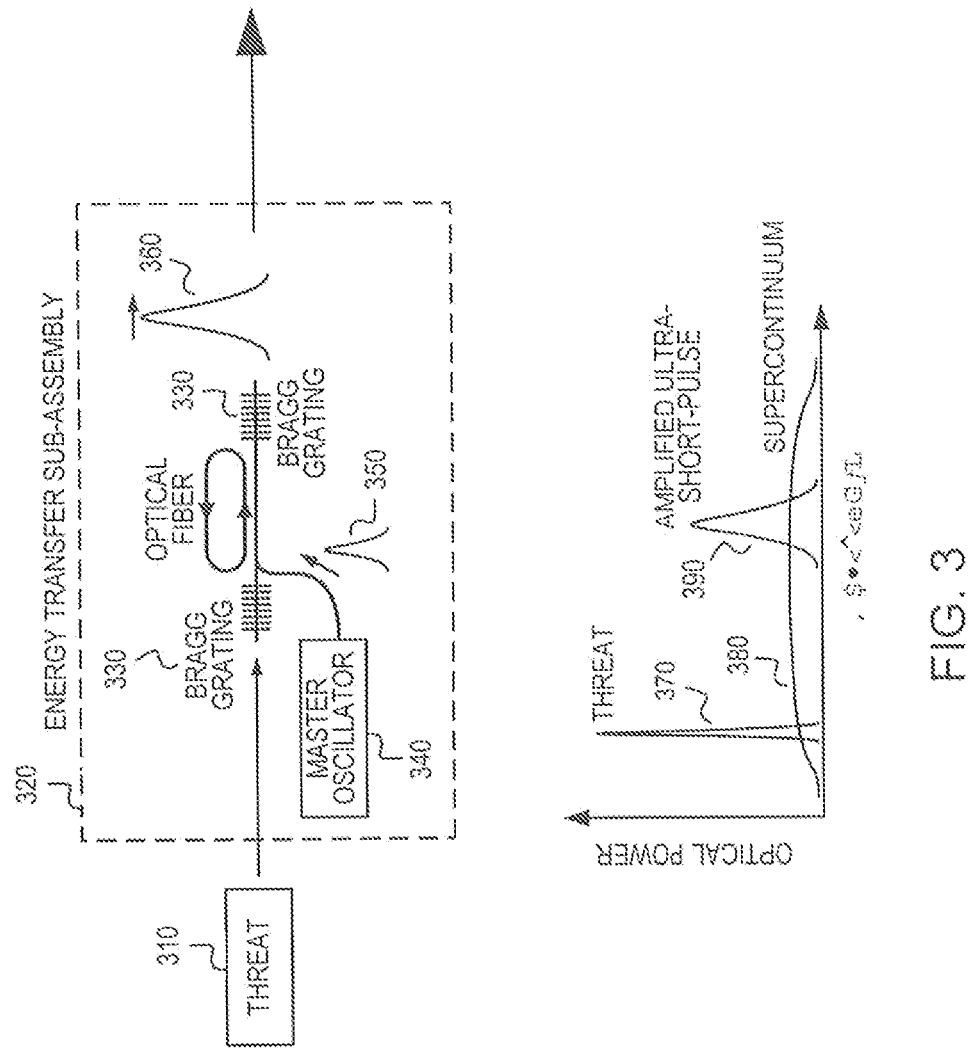
FIG. 3 is a high-level block diagram of a sub-assembly configured to transfer energy from a CW threat laser source to responsive and counter USP, according to one embodiment of the present invention.

The lower portion of FIG. 3 illustrates the spectra of the various optical signals. The laser threat has a narrow-band spectrum 370 and amplifies a portion of the supercontinuum which has an ultra-broadband spectrum 380 to produce a high-peak-energy ultra-short pulse with a moderately broad spectrum 390. The center wavelength of the amplified ultra-short pulse is always shifted by one Stokes shift from the wavelength of the threat light.

Figure 4:
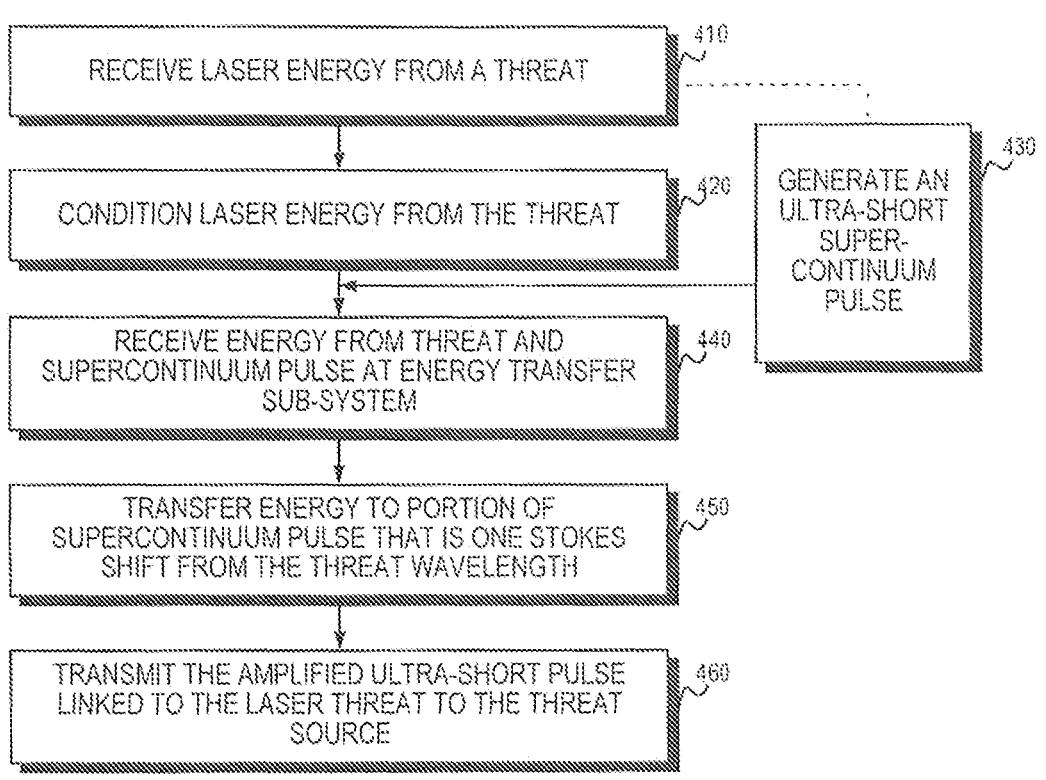
FIG. 4 is a flow chart of one methodology, according to the present invention, for countering a CW high energy laser system.

A methodology, according to one embodiment of the present invention, for countering a high energy laser threat can be seen in FIG. 4. The method begins by receiving 410, by collection optics, continuous wave laser threat. The invention filters the laser energy to condition 420 a wavelength of the continuous wave laser threat.

The process continues by an energy transfer sub-system receiving 440 the portion of the continuous wave laser threat. Concurrently, an ultra-short pulse having an ultra-broad, supercontinuum spectrum is formed 430 by an oscillator. The ultra-short pulse is also received 440 by the energy transfer sub-system wherein energy is transferred 450 to a portion of the supercontinuum pulse that is one stokes shift from the threat wavelength.

The process terminates by transmitting 460 the amplified ultra-broadband, supercontinuum pulse linked to the continuous wave laser threat to the threat.

Figure 5:
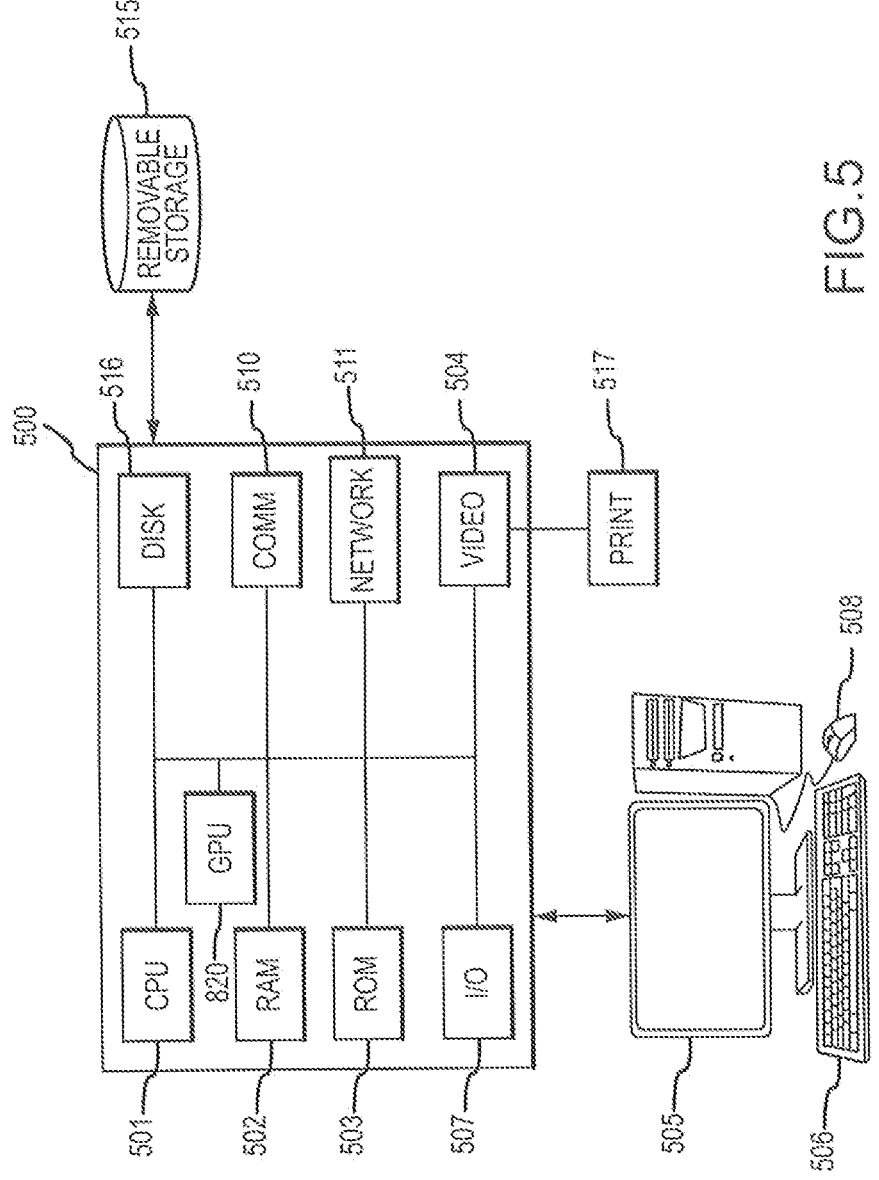
FIG. 5 is a block diagram of a computer system suitable for implementation of one or more embodiments of far source positional determination.

One of reasonable skill will also recognize that portions of the present invention may be implemented on a conventional or general-purpose computer system, such as a personal computer (PC), server, a laptop computer, a notebook computer, a handheld, or pocket computer, and/or a server computer. FIG. 5 is a very general block diagram of a computer system in which software-implemented processes of the present invention may be embodied. As shown, system 500 comprises a central processing unit(s) (CPU) or processor(s) 501 coupled to a random-access memory (RAM) 502, a graphics processor unit(s) (GPU) 520, a read-only memory (ROM) 503, a keyboard or user interface 506, a display or video adapter 504 connected to a display device 505, a removable (mass) storage device 515 (e.g., floppy disk, CD-ROM, CD-R, CD-RW, DVD, or the like), a fixed (mass) storage device 516 (e.g., hard disk), a communication (COMM) port(s) or interface(s) 510, and a network interface card (NIC) or controller 511 (e.g., Ethernet). Although not shown separately, a real time system clock is included with the system 500, in a conventional manner.

CPU 501 comprises a suitable processor for implementing the present invention. The CPU 501 communicates with other components of the system via a bi-directional system bus 520 (including any necessary input/output (I/O) controller 507 circuitry and other "glue" logic). The bus, which includes address lines for addressing system memory, provides data transfer between and among the various components. Random-access memory 502 serves as the working memory for the CPU 501. The read-only memory (ROM) 503 contains the basic input/output system code (BIOS)—a set of low-level routines in the ROM that application programs and the operating systems can use to interact with the hardware, including reading characters from the keyboard, outputting characters to printers, and so forth.

Mass storage devices 515, 516 provide persistent storage on fixed and removable media, such as magnetic, optical, or magnetic-optical storage systems, flash memory, or any other available mass storage technology. The mass storage may be shared on a network, or it may be a dedicated mass storage. As shown in FIG. 5, fixed storage 516 stores a body of program and data for directing operation of the computer system, including an operating system, user application programs, driver, and other support files, as well as other data files of all sorts. Typically, the fixed storage 516 serves as the main hard disk for the system.

In basic operation, program logic (including that which implements methodology of the present invention described below) is loaded from the removable storage 515 or fixed storage 516 into the main (RAM) memory 502, for execution by the CPU 501. During operation of the program logic, the system 500 accepts user input from a keyboard and pointing device 506, as well as speech-based input from a voice recognition system (not shown). The user interface 506 permits selection of application programs, entry of keyboard-based input or data, and selection and manipulation of individual data objects displayed on the screen or display device 505. Likewise, the pointing device 508, such as a mouse, track ball, pen device, or the like, permits selection and manipulation of objects on the display device. In this manner, these input devices support manual user input for any process running on the system.

The computer system 500 displays text and/or graphic images and other data on the display device 505. The video adapter 504, which is interposed between the display 505 and the system's bus, drives the display device 505. The video adapter 504, which includes video memory accessible to the CPU 501, provides circuitry that converts pixel data stored in the video memory to a raster signal suitable for use by a cathode ray tube (CRT) raster or liquid crystal display (LCD) monitor. A hard copy of the displayed information, or other information within the system 500, may be obtained from the printer 517, or other output device.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention.

The system itself communicates with other devices (e.g., other computers) via the network interface card (NIC) 511 connected to a network (e.g., Ethernet network, Bluetooth wireless network, or the like). The system 500 may also communicate with local occasionally connected devices (e.g., serial cable-linked devices) via the communication (COMM) interface 510, which may include a RS-232 serial port, a Universal Serial Bus (USB) interface, or the like. Devices that will be commonly connected locally to the interface 510 include laptop computers, handheld organizers, digital cameras, and the like.

While there have been described above the principles of the present invention in conjunction with a counter high-energy laser system, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se, and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A defensive laser amplification system, comprising;

collection optics configured to receive laser energy from a threat;

a threat conditioning module, coupled to the collection optics, configured to condition the laser energy from the threat;

an oscillator configured to form an ultra-short supercontinuum pulse;

an energy transfer sub-system, coupled to the threat conditioning module and the oscillator, configured to receive the conditioned laser energy and the ultra-short supercontinuum pulse and configured to convert the conditioned laser energy to a high-energy ultra-short-pulse; and transmission optics coupled to the energy transfer sub-system and configured to transmit the high-energy ultra-short-pulse linked to the threat.

2. The defensive laser amplification system according to claim 1, further comprising an optical amplifier to increase the energy and peak optical power of an ultra-short counter pulse.

3. The defensive laser amplification system according to claim 1, further comprising a Raman amplifier to increase the energy and peak optical power of an ultra-short counter pulse.

4. The defensive laser amplification system according to claim 1, wherein the resonating cavity in the energy transfer sub-system is an amplifying fiber.

5. The defensive laser amplification system according to claim 4, wherein the amplifying fiber is a solid-core optical fiber.

6. The defensive laser amplification system according to claim 4, wherein the amplifying fiber is a photonic crystal fiber.

7. The defensive laser amplification system according to claim 1, wherein the oscillator employs a mode-locked laser.

8. The defensive laser amplification system according to claim 7, wherein a spectrum of an ultra-short pulse from the mode-locked laser is expanded by a combination of nonlinear optical effects.

9. The defensive laser amplification system according to claim 1, wherein the high-energy ultra-short-pulse has a wavelength linked to the conditioned laser energy.

10. The defensive laser amplification system according to claim 1, wherein a medium for the energy transfer sub-system is configured to have a large optical nonlinearity.

11. The defensive laser amplification system according to claim 1, wherein the laser energy is a continuous wave laser threat.

12. The defensive laser amplification system according to claim 11, wherein the threat conditioning module is configured to identify a wavelength of the continuous wave laser threat.

13. A method for transmitting a defensive laser, comprising:

receiving, by collection optics, laser energy from a threat;

filtering the laser energy from the threat;

forming, by an oscillator, an ultra-short supercontinuum pulse receiving the conditioned laser energy by an energy transfer sub-system;

injecting into a resonating cavity of the energy transfer sub-system, the ultra-short supercontinuum pulse thereby converting a portion of the a ultra-short supercontinuum pulse to a high-peak power ultra-short-pulse and transmitting by transmission optics the high-peak power ultra-short-pulse to the threat.

14. The method for transmitting a defensive laser according to claim 13, wherein the laser energy is a continuous wave laser threat.

15. The method for transmitting a defensive laser according to claim 13, further comprising identifying a wavelength of the continuous wave laser threat.

16. The method for transmitting a defensive laser according to claim 15, wherein the high-peak power ultra-short-pulse has a wavelength linked to the threat.

17. The method for transmitting a defensive laser according to claim 13, further comprising configuring a Raman amplifier for a spectral portion of the ultra-broadband, supercontinuum pulse.

18. The method for transmitting a defensive laser according to claim 17, further comprising forming an amplified ultra-short-pulse by Stimulated Raman Amplification in the Raman amplifier.

19. The method for transmitting a defensive laser according to claim 18, further comprising linking the amplified ultra-broadband, supercontinuum pulse to a wavelength of the threat.

20. The method for transmitting a defensive laser according to claim 13, wherein the energy transfer sub-system employs an amplifying fiber.

21. The method for transmitting a defensive laser according to claim 20, wherein the amplifying fiber is a solid-core optical fiber.

22. The method for transmitting a defensive laser according to claim 20, wherein the amplifying fiber is a photonic crystal fiber.

23. The method for transmitting a defensive laser according to claim 13, wherein the oscillator includes a mode-locked laser.

24. The method for transmitting a defensive laser according to claim 23, further comprising expanding the ultra-short pulse from the mode-locked laser by a combination of nonlinear optical effects.

25. The method for transmitting a defensive laser according to claim 13, further comprising configuring a medium used for energy transfer in the energy transfer sub-system to have a large optical nonlinearity.

* * * * *